United States Patent
Gupta et al.

(10) Patent No.: US 11,086,864 B2
(45) Date of Patent: Aug. 10, 2021

(54) OPTIMIZING SEARCH FOR DATA

(71) Applicant: SAP SE, Walldorf (DE)

(72) Inventors: Yadesh Gupta, Gurgaon (IN); Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 1296 days.

(21) Appl. No.: 15/359,626

(22) Filed: Nov. 23, 2016

(65) Prior Publication Data
US 2018/0144027 A1 May 24, 2018

(51) Int. Cl.
*G06F 16/00* (2019.01)
*G06F 16/2453* (2019.01)
*G06F 16/22* (2019.01)

(52) U.S. Cl.
CPC .......... *G06F 16/2453* (2019.01); *G06F 16/22* (2019.01)

(58) Field of Classification Search
CPC ................................................ G06F 16/2453
USPC ........................................................ 707/715
See application file for complete search history.

(56) References Cited

U.S. PATENT DOCUMENTS

| | | | | |
|---|---|---|---|---|
| 2010/0114843 A1* | 5/2010 | Farrar | ............... | G06F 16/2246 707/693 |
| 2015/0278268 A1* | 10/2015 | El-Ali | ................ | G06F 16/245 707/722 |

* cited by examiner

*Primary Examiner* — Anhtai V Tran
(74) *Attorney, Agent, or Firm* — Buckley, Maschoff & Talwalkar LLC

(57) ABSTRACT

Methods and system are disclosed that relate to optimizing search for data. In one aspect, an attribute vector may include unique value identifiers and be associated with a dictionary structure. For a unique value identifiers stored in an attribute vector and associated with the dictionary structure, start address and end address associated with the unique value identifiers is computed. Based on the computation, a range of positional addresses associated with the unique value identifiers may be generated and stored in a data structure. Upon receiving a request to search for data, the range of positional addresses in which the unique value identifiers may be searched is determined. Based on the determination, a database search engine optimizes the search for data in the attribute vector.

20 Claims, 22 Drawing Sheets

| | |
|---|---|
| 1 | PHONE 1 |
| 2 | PHONE 2 |
| 3 | PHONE 3 |
| 4 | PHONE 4 |
| 5 | PHONE 5 |
| 6 | PHONE 6 |
| 7 | PHONE 7 |
| 8 | PHONE 8 |
| 9 | PHONE 9 |
| 10 | PHONE 10 |

102 / 104

TABLE 1

FIG. 1

| | 302 | |
|---|---|---|
| -1 | -1 | |
| 2 | 7 | |
| 9 | 10 | |
| 8 | 6 | |
| 9 | 10 | |
| 9 | 7 | |
| 3 | 10 | 7 |
| 1 | 7 | 7 |
| 1 | 10 | 10 |
| 1 | 10 | 7 |
| 2 | 6 | 7 |
| 8 | 6 | 7 |
| 8 | 5 | 10 |
| 2 | 5 | 10 |
| 3 | 4 | 10 |
| 1 | 7 | 10 |
| 3 | 7 | 7 |
| 3 | -1 | -1 |

TABLE 2

FIG. 3

| DICTIONARY ID 402 | START ADDRESS 404 | END ADDRESS 406 |
|---|---|---|
| 1 | 3 | 11 |
| 2 | 5 | 17 |
| 3 | 1 | 12 |
| 4 | 20 | 20 |
| 5 | 21 | 22 |
| 6 | 23 | 31 |
| 7 | 18 | 44 |
| 8 | 6 | 15 |
| 9 | 13 | 16 |
| 10 | 25 | 42 |

TABLE 3

FIG. 4

| DICTIONARY ID 502 | NUMBER OF ROWS TO SCAN 504 | % PERFORMANCE GAIN 506 |
|---|---|---|
| 1 | 9 | 79.5 |
| 2 | 13 | 70.4 |
| 3 | 12 | 72.7 |
| 4 | 1 | 97.2 |
| 5 | 2 | 86.36 |
| 6 | 9 | 79.5 |
| 7 | 27 | 38.63 |
| 8 | 10 | 77.3 |
| 9 | 4 | 90.9 |
| 10 | 18 | 59.1 |

TABLE 4

FIG. 5

TABLE 5

| | ONE BILLION 604 | TEN BILLION 606 | HUNDRED BILLION 608 | ONE TRILLION 610 |
|---|---|---|---|---|
| 10 | 7.12808E-05 | 7.92009E-05 | 8.7121E-05 | 9.50411E-05 |
| 100 | 0.0007128084 | 0.000792009 | 0.00087121 | 0.000950411 |
| 1000 | 0.007128084 | 0.0079200 94 | 0.008712103 | 0.009504113 |
| 10000 | 0.0712808 44 | 0.079200 938 | 0.087121031 | 0.095041125 |
| 100000 | 0.712808439 | 0.792009 376 | 0.871210314 | 0.950411252 |
| 1000000 | 7.128084386 | 7.920093763 | 8.712103139 | 9.504112515 |

| POSITION ID 702 | DICTIONARY ID 704 | START ADDRESS 706 | END ADDRESS 708 |
|---|---|---|---|
| 0 | 1, 2, 3, 8, 9 | 1 | 17 |
| 1 | 4, 5, 6, 7, 10 | 18 | 44 |

TABLE 6

FIG. 7

| POSITION ID 802 | DICTIONARY ID 804 | ROWS TO SCAN 806 | PERFORMANCE GAIN IN % 808 |
|---|---|---|---|
| 0 | 1, 2, 3, 8, 9 | 18 | 59.1 |
| 1 | 4, 5, 6, 7, 10 | 27 | 38.6 |

TABLE 7

FIG. 8

| DICTIONARY ID 902 | POSITION ID 904 |
|---|---|
| 1 | 0 |
| 2 | 0 |
| 3 | 0 |
| 4 | 1 |
| 5 | 1 |
| 6 | 1 |
| 7 | 1 |
| 8 | 0 |
| 9 | 0 |
| 10 | 1 |

TABLE 8

FIG. 9

| POSITION ID 1002 | START ADDRESS 1004 | END ADDRESS 1006 |
|---|---|---|
| 0 | 1 | 17 |
| 1 | 18 | 44 |

TABLE 9

FIG. 10

DICTIONARY 1102

| DICTIONARY ID 1106 | START ADDRESS 1108 | END ADDRESS 1110 |
|---|---|---|
| 1 | 3 | 11 |
| 2 | 5 | 17 |
| 3 | 1 | 12 |
| 4 | 20 | 20 |
| 5 | 21 | 22 |
| 6 | 23 | 31 |
| 7 | 18 | 44 |
| 8 | 6 | 15 |
| 9 | 13 | 16 |
| 10 | 25 | 42 |

TABLE 10A

POSITIONAL ADDRESS DISTANCE MATRIX 1104

|    | 1 | 2 | 3 | 4 | 5 | 6 | 7 | 8 | 9 | 10 |
|----|---|---|---|---|---|---|---|---|---|----|
| 1  |   | 8 | 3 | 26 | 29 | 40 | 48 | 7 | 15 | 53 |
| 2  |   |   | 9 | 18 | 21 | 32 | 40 | 3 | 9 | 35 |
| 3  |   |   |   | 27 | 30 | 41 | 49 | 8 | 16 | 54 |
| 4  |   |   |   |    | 3 | 14 | 26 | 19 | 11 | 27 |
| 5  |   |   |   |    |   | 11 | 25 | 22 | 14 | 11 |
| 6  |   |   |   |    |   |    | 18 | 33 | 25 | 13 |
| 7  |   |   |   |    |   |    |    | 41 | 33 | 9 |
| 8  |   |   |   |    |   |    |    |    | 8 | 46 |
| 9  |   |   |   |    |   |    |    |    |   | 38 |
| 10 |   |   |   |    |   |    |    |    |   |    |

TABLE 10B

FIG. 11

DICTIONARY 1202

| DICTIONARY ID 1206 | START ADDRESS 1208 | END ADDRESS 1210 |
|---|---|---|
| 1, 3 | 1 | 12 |
| 2 | 5 | 17 |
| 4 | 20 | 20 |
| 5 | 21 | 22 |
| 6 | 23 | 31 |
| 7 | 18 | 44 |
| 8 | 6 | 15 |
| 9 | 13 | 16 |
| 10 | 25 | 42 |

TABLE 11A

POSITIONAL ADDRESS DISTANCE MATRIX 1204

| | 1 | 2 | 4 | 5 | 6 | 7 | 8 | 9 | 10 |
|---|---|---|---|---|---|---|---|---|---|
| 1, 3 | | 9 | 27 | 30 | 41 | 49 | 8 | 16 | 54 |
| 2 | | | 18 | 21 | 32 | 40 | 3 | 9 | 45 |
| 4 | | | | 3 | 14 | 26 | 19 | 11 | 27 |
| 5 | | | | | 11 | 25 | 22 | 14 | 24 |
| 6 | | | | | | 18 | 33 | 25 | 13 |
| 7 | | | | | | | 41 | 33 | 9 |
| 8 | | | | | | | | 8 | 46 |
| 9 | | | | | | | | | 38 |
| 10 | | | | | | | | | |

TABLE 11B

FIG. 12

TABLE 12A

DICTIONARY 1302

| DICTIONARY ID 1306 | START ADDRESS 1308 | END ADDRESS 1310 |
|---|---|---|
| 1,2,3,8,9 | 1 | 17 |
| 4,5,6 | 20 | 31 |
| 7,10 | 18 | 44 |

TABLE 12B

ADDRESS DISTANCE MATRIX 1304

|  | 1,2,3,8,9 | 4,5,6 | 7,10 |
|---|---|---|---|
| 1,2,3,8,9 |  |  | 7,10 |
| 4,5,6 |  | 33 | 44 |
| 7,10 |  |  | 15 |

FIG. 13

| DICTIONARY ID 1402 | POSITION ID-I 1404 | POSITION ID-II 1406 | POSITION ID-III 1408 |
|---|---|---|---|
| 1 | 1 | 0 | 0 |
| 2 | 2 | 1 | 0 |
| 3 | 3 | 0 | 0 |
| 4 | 0 | 2 | 0 |
| 5 | 0 | 3 | 0 |
| 6 | 0 | 4 | 0 |
| 7 | 4 | 5 | 1 |
| 8 | 5 | 0 | 0 |
| 9 | 0 | 6 | 0 |
| 10 | 0 | 7 | 2 |

TABLE 13

FIG. 14

TABLE 14A

| POSITION ID-I | START ADDRESS | END ADDRESS |
|---|---|---|
| 0 | 0 | 0 |
| 1 | 3 | 11 |
| 2 | 5 | 8 |
| 3 | 1 | 12 |
| 4 | 6 | 15 |
| 5 | 13 | 14 |

{ 1502  { 1504  { 1506

TABLE 14B

| POSITION ID-II | START ADDRESS | END ADDRESS |
|---|---|---|
| 0 | 0 | 0 |
| 1 | 17 | 17 |
| 2 | 20 | 20 |
| 3 | 21 | 22 |
| 4 | 23 | 24 |
| 5 | 18 | 29 |
| 6 | 16 | 16 |
| 7 | 25 | 30 |

{ 1508  { 1510  { 1512

TABLE 14C

| POSITION ID-III | START ADDRESS | END ADDRESS |
|---|---|---|
| 0 | 0 | 0 |
| 1 | 31 | 44 |
| 2 | 32 | 42 |

TABLE 15A

| | COL1 | COL2 | COL3 | COL4 |
|---|---|---|---|---|
| N | 10000 | 10000 | 100000 | 100000 |
| N/10 | 1000 | 1000 | 10000 | 10000 |
| N/100 | 100 | 100 | 1000 | 1000 |
| N/500 | 20 | 20 | 200 | 2000 |

1602, 1604, 1606, 1608, 1610

TABLE 15B

| | COL1 | COL2 | COL3 | COL4 |
|---|---|---|---|---|
| A (N) | 30 | 40 | 42 | 45 |
| A (N/10) | 40 | 42 | 44 | 47 |
| A (N/100) | 50 | 45 | 50 | 48 |
| A (N/500) | 70 | 47 | 55 | 50 |

1612, 1614, 1616, 1618, 1620

TABLE 15C

| | COL1 | COL2 | COL3 | COL4 |
|---|---|---|---|---|
| PRIORITY | 0.3 | 0.3 | 0.2 | 0.2 |

1622, 1624, 1626, 1628, 1630

TABLE 15D

| | COL1 | COL2 | COL3 | COL4 |
|---|---|---|---|---|
| $P(N)*W_1$ | 3588867188 | 3076171875 | 2407226565625 | 2.68555E+11 |
| $P(N/2)*W_2$ | 3076171875 | 2973632813 | 2324218750 | 2.58789E+11 |
| $P(N/4)*W_3$ | 2563476563 | 2819824219 | 2075195312.5 | 2.53906E+11 |
| $P(N/8)*W_4$ | 1538085938 | 2717285156 | 1867675781.3 | 2.44141E+11 |

TABLE 15E

| | COL1 | COL2 | COL3 | COL4 |
|---|---|---|---|---|
| N | 89.46253953 | 89.46253953 | 935.176275 | 9757.271554 |
| N/10 | 19.48948277 | 19.48948277 | 235.445708 | 2759.965878 |
| N/100 | 8.842597888 | 8.842597888 | 128.976859 | 1695.27739 |
| N/500 | 5.422275506 | 5.422275506 | 94.7736351 | 1353.245152 |

{1642, 1644, 1646, 1648, 1650}

TABLE 15F

| | COL1 | COL2 | COL3 | COL4 |
|---|---|---|---|---|
| N | 0 | 0 | 0 | 0 |
| N/10 | 1 | 1 | 0 | 0 |
| N/100 | 0 | 0 | 1 | 0 |
| N/500 | 0 | 0 | 0 | 1 |

{1652, 1654, 1656, 1658, 1660}

TABLE 15G

| | COL1 | COL2 | COL3 | COL4 |
|---|---|---|---|---|
| N | 0 | 0 | 0 | 0 |
| N/10 | 3076171875 | 2973632813 | 0 | 0 |
| N/100 | 0 | 0 | 2075195312.5 | 2.44141E+11 |
| N/500 | OBJECTIVE | | | 2.70942E+11 |

{1662}

TABLE 15H

| | COL1 | COL2 | COL3 | COL4 |
|---|---|---|---|---|
| N | 0 | 0 | 0 | 0 |
| N/10 | 19.48948277 | 19.48948277 | 0 | 0 |
| N/100 | 0 | 0 | 128.976859 | 0 |
| N/500 | 0 | 0 | 0 | 1353.245152 |

TABLE 16A

TABLE 16A1    1 BILLIONS

| | COL1 | COL2 | COL3 |
|---|---|---|---|
| N | 10000 | 100000 | 50000 |
| N/10 | 1000 | 100000 | 5000 |
| N/100 | 100 | 10000 | 500 |
| N/500 | 20 | 2000 | 100 |

⎫ 1702
⎫ 1704  ⎫ 1706  ⎫ 1708

TABLE 16A2    10 BILLIONS

| | COL1 | COL2 |
|---|---|---|
| | 100000 | 60000 |
| | 10000 | 6000 |
| | 1000 | 600 |
| | 200 | 120 |

⎫ 1710  ⎫ 1712

TABLE 16A3    1 TRILLIONS

| | COL1 | COL2 | COL3 |
|---|---|---|---|
| N | 100000 | 17000 | 80000 |
| N/10 | 10000 | 1700 | 8000 |
| N/100 | 1000 | 170 | 800 |
| N/500 | 200 | 34 | 160 |

⎫ 1714  ⎫ 1716  ⎫ 1718  ⎫ 1720

TABLE 16A4    10 BILLIONS

| COL1 | COL2 | COL3 | COL4 |
|---|---|---|---|
| 10000 | 100000 | 15000 | 25000 |
| 1000 | 10000 | 1500 | 2500 |
| 100 | 1000 | 150 | 250 |
| 200 | 200 | 30 | 50 |

TABLE 16B

TABLE 1 (1730) — 0.1

| COL1 | COL2 | COL3 |
|---|---|---|
| 0.07 | 0.015 | 0.015 |

TABLE 2 (1732) — 0.3

| COL1 | COL2 |
|---|---|
| 0.2 | 0.1 |

TABLE 3 (1734) — 0.2

| COL1 | COL2 | COL3 |
|---|---|---|
| 0.0125 | 0.0125 | 0.015 |

TABLE 4 (1736) — 0.4

| COL1 | COL2 | COL3 | COL4 |
|---|---|---|---|
| 0.2 | 0.1 | 0.05 | 0.05 |

TABLE 16C

| | TABLE 1 | | | TABLE 2 | | TABLE 3 | | | TABLE 4 | | | |
|---|---|---|---|---|---|---|---|---|---|---|---|---|
| | 1740 | 1742 | 1744 | 1746 | 1748 | 1750 | 1752 | 1754 | 1756 | 1758 | 1760 | 1762 |
| A(N) | 45 | 35 | 50 | 47 | 44 | 38 | 50 | 55 | 40 | 50 | 55 | 45 |
| A(N/10) | 48 | 40 | 65 | 50 | 48 | 48 | 80 | 65 | 50 | 55 | 56 | 50 |
| A(N/100) | 55 | 45 | 75 | 54 | 54 | 60 | 82 | 75 | 60 | 60 | 60 | 52 |
| A(N/500) | 60 | 50 | 80 | 58 | 58 | 65 | 84 | 80 | 78 | 66 | 62 | 54 |

FIG. 17B

TABLE 16D

| | TABLE 1 {1766} | | | TABLE 2 {1768} | | TABLE 3 {1770} | | | TABLE 4 {1772} | | | |
|---|---|---|---|---|---|---|---|---|---|---|---|---|
| M(N)    | 89 | 9757 | 461 | 1033 | 614 | 1179 | 195 | 940 | 99 | 1033 | 150 | 252 |
| M(N/10) | 19 | 2760 | 112 | 245  | 142 | 260  | 39  | 205 | 20 | 245  | 32  | 55  |
| M(N/100)| 9  | 1695 | 58  | 130  | 73  | 131  | 17  | 102 | 9  | 130  | 14  | 26  |
| M(N/500)| 5  | 1353 | 41  | 95   | 52  | 95   | 11  | 73  | 5  | 95   | 9   | 18  |

{1764}

TABLE 16E — DECISION VARIABLES

| | {1776} | | | {1778} | | {1780} | | | {1782} | | | |
|---|---|---|---|---|---|---|---|---|---|---|---|---|
| N     | 0 | 1 | 0 | 1 | 0 | 1 | 1 | 0 | 1 | 0 | 1 | 0 |
| N/10  | 1 | 0 | 0 | 0 | 1 | 0 | 0 | 0 | 0 | 1 | 1 | 0 |
| N/100 | 0 | 0 | 0 | 0 | 0 | 0 | 0 | 0 | 0 | 0 | 0 | 0 |
| N/500 | 0 | 0 | 0 | 0 | 0 | 0 | 0 | 0 | 0 | 0 | 0 | 0 |

TABLE 16F

TABLE 1

| | | | |
|---|---|---|---|
| N | 657958984 | 23803710938 | 732421875 |
| N/10 | 622070313 | 21972656250 | 512695313 |
| N/100 | 538330078 | 20141601563 | 366210938 |
| N/500 | 478515625 | 18310546875 | 292968750 |

TABLE 2

| | |
|---|---|
| 21997070703125 | 65625000000 |
| 20751953125 | 60937500000 |
| 19091796875 | 53906250000 |
| 17431640625 | 49218750000 |

TABLE 3

| | | | |
|---|---|---|---|
| N | 3216552734375 | 389099121094 | 11206054687500 |
| N/10 | 2697753906250 | 155639648438 | 8715820312500 |
| N/100 | 2075195312500 | 140075683594 | 6225585937500 |
| N/500 | 1815795898438 | 124511718750 | 4980468750000 |

TABLE 4

| | |
|---|---|
| 20507812500 | 5767822266 |
| 17089843750 | 5639648438 |
| 13671875000 | 5126953125 |
| 7519531250 | 4870605469 |

| | |
|---|---|
| 1037597656250 | |
| 933837890625 | |
| 830078125000 | |
| 705566406250 | |

OPTIMIZING SEARCH FOR DATA

BACKGROUND

Advancements in database technologies have provided efficient means of data storage. For instance, a dataset including values may be stored in a table in a database in compressed form. Various compression techniques, such as run-length encoding, cluster coding, dictionary coding, etc., may be used for compressing the data. However, when such compressed data is searched, there may be complexities and challenges like overhead for storage of data, sorting of rows and adjusting data values between the rows, reconstruction of tuple when the data is encoded, etc. Further, irrespective of the storage location, the entire dataset may need to be scanned or searched. Such searching mechanisms may not be optimal, are inefficient and may consume a large amount of time for execution. Although compression of data improves the storage efficiency, optimally searching for data may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 1 is a table showing a dictionary structure associated with an attribute vector, according to an embodiment.

FIG. 3 shows a table representing an attribute vector storing data related to a transaction, according to an embodiment.

FIG. 4 is a table representing a data structure storing start address and end address associated with unique value identifiers, according to an embodiment.

FIG. 5 shows a table including metrics related performance for searching data, according to an embodiment.

FIG. 6 shows a table including memory consumed for storing positional addresses associated with data, according to an embodiment.

FIG. 7 shows a table including the unique value identifiers that optimizes memory consumed for storing positional addresses, according to an embodiment.

FIG. 8 shows a table including metrics related to performance for searching data, according to an embodiment.

FIG. 9 shows a table including positional identifiers for unique value identifiers in the dictionary structure, according to an embodiment.

FIG. 10 shows a table including positional address ranges for positional identifiers, according to an embodiment.

FIG. 11 shows tables including start address and end address associated with unique value identifiers and positional address distance matrix, according to an embodiment.

FIG. 12 shows tables including start address and end address associated with unique value identifiers and positional address distance matrix, according to an embodiment.

FIG. 13 shows tables including start address, end address associated with unique value identifiers and positional address distance matrix, according to an embodiment.

FIG. 14 shows a table including multiple positional identifiers for unique value identifiers, according to an embodiment.

FIG. 15 shows tables including positional address ranges associated with multiple positional identifiers, according to an embodiment.

FIG. 16A shows tables including metrics related to positional address range indices, average number of scans required to search data, priority assignment to the columns, computed performance gain, according to an embodiment.

FIG. 16B shows tables including metrics related to memory consumed for storing positional addresses, value of decision variable for maximizing the objective function using Linear algorithm, computation of objective value, and memory consumed for a positional address range index, according to an embodiment.

FIG. 17A shows tables including metrics related to positional address range indices, according to an embodiment.

FIG. 17B shows tables including metrics related to priority assignment to the columns, and average number of scans required to search data, according to an embodiment.

FIG. 17C shows tables including metrics related to memory consumed for storing positional addresses, value of decision variable for maximizing the objective function using Linear algorithm, according to an embodiment.

FIG. 17D shows tables including metrics related to memory consumed for a positional address range index, according to an embodiment.

DETAILED DESCRIPTION

Figure 2:
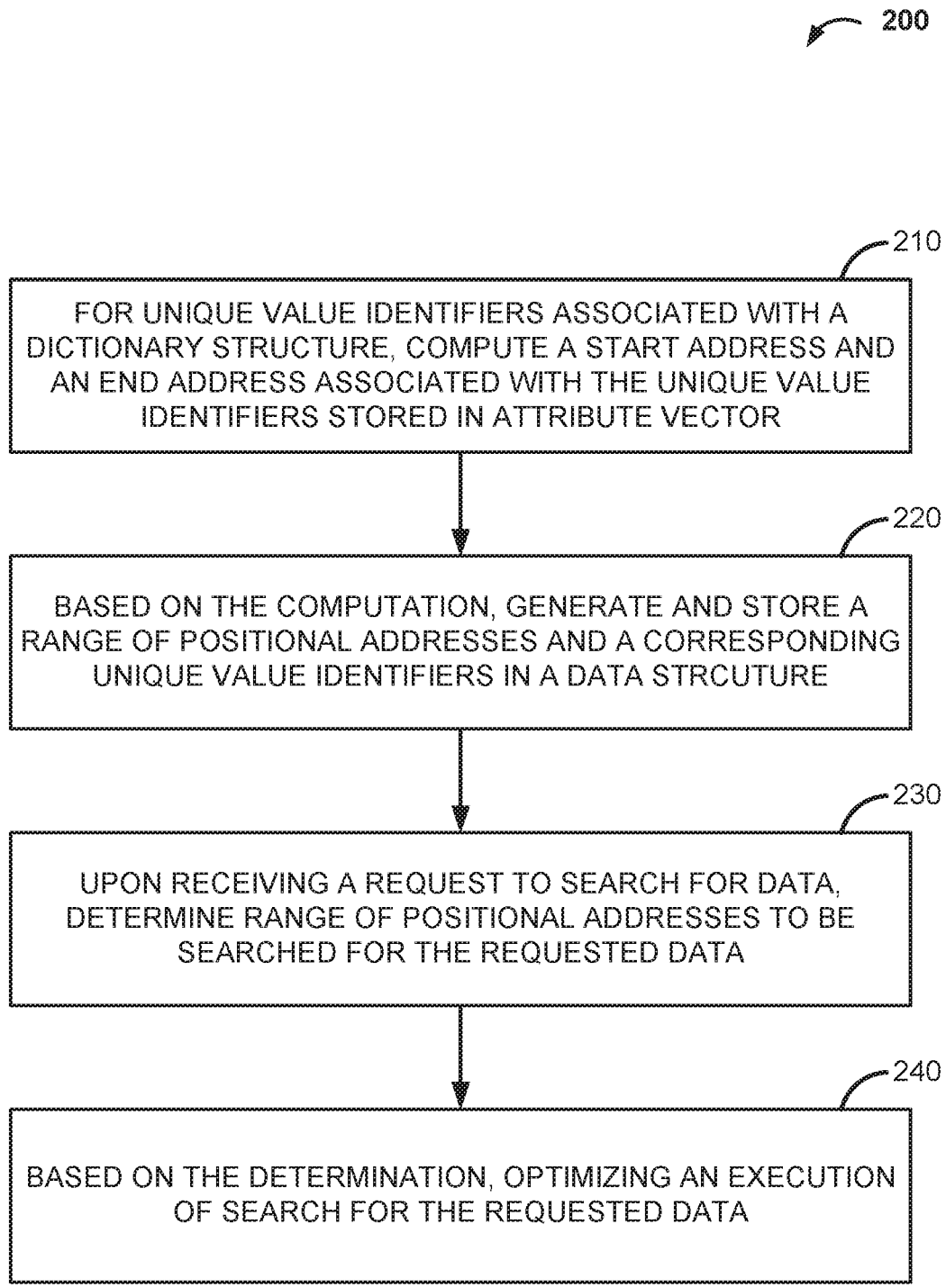
FIG. 2 is a flow diagram illustrating a process to optimize search for data in an attribute vector, according to an embodiment.

Embodiments of techniques related to optimizing search for data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Technological advancements may propel an increase in volume of data Some of the data may have shorter life cycle as the data may get updated or replaced with time. For instance, the data related to products (e.g., cell phones) may get modified or replaced, when newer models of cell phones are released. Periodically, this may generate data that may be redundant and storing such redundant data may be an overhead to an enterprise.

Such data may be stored in multiple data stores that may be centrally accessed over a network by systems and applications in the enterprise. The data may correspond to structured and unstructured data, transactional data, data related to business processes, etc. Such data may reside in data structures (e.g., tables, flat files, etc.) in data stores. Data store may include an in-memory database, a web-based database, a conventional database, etc. The in-memory database may include a main memory and an underlying hardware for executing storage and computational operations. Typically, the data required for processing may be available in the main memory and operations such as computations and memory-reads may be executed in the main memory.

In an embodiment, a table in a database may be represented by a two-dimensional data structure with cells organized in rows and columns. An attribute vector may correspond to rows or columns and the data in the in-memory database may be stored as a row store or a column store. In the row store, the fields of every row are stored sequentially, while in the column store, the fields of every column are stored in contiguous memory locations. In an embodiment, row based storage and column based storage store data that can be modeled and accessed by various components of the in-memory management system, such as front-end development application, database application, a query processing engine, etc. In column based storage, values associated with the data may be stored as columns in contiguous memory locations. These stored values may be intrinsically sorted to place several contiguous values adjacent to each other.

FIG. 1 is a table showing a dictionary structure associated with an attribute vector, according to an embodiment. FIG. 1 shows columns 102 and 104 of Table 1. In an embodiment, column 104 includes data values and the data values are correspondingly associated with unique value identifiers (e.g., also referred to value ids). Table 1 may represent the dictionary structure of the data values 104 typically including a list of sorted values, as appearing in column 104 and value identifiers 102

In an embodiment, to reduce the memory occupied by data in column 104 of table using a dictionary-based compression method, a sorted list of different values appearing in column 102 may be generated. For example, table 1 includes column 104, which has values such as Phone 1, Phone 2, Phone 3, etc. Dictionary structure, as shown in Table 1 includes value identifiers 102 that may represent the different values of data stored in column 104. Values of data, as shown in column 104 of Table 1, may be replaced with value identifiers 102 that may reduce memory footprint of the data represented by the column.

FIG. 2 is a flow diagram illustrating process 200 to optimize search for data in an attribute vector, according to an embodiment. Data may be stored in an attribute vector and information related to storage (e.g., start address, end address, range of positional address, etc.) of the data may be determined and used to optimize the search for the data. The data values may be stored in the attribute vector as unique value identifiers and may be associated with a dictionary structure. In an embodiment, for multiple unique value identifiers associated with a dictionary structure, a start address and an end address associated with the multiple unique value identifiers is computed, at 210. A unique value identifier of the dictionary structure may be stored over a range of addresses (e.g., also referred to as positional addresses) in the attribute vector.

In an embodiment, based on the computation, a range of positional addresses for the multiple unique value identifiers is generated and stored in a data structure, at 220. For example, based on a transaction or a business process, the unique value identifiers may be stored in the attribute vectors at contiguous locations or non-contiguous locations. Based on the storage location or position of the unique value identifier in the attribute vector, the unique value identifiers may be associated with a positional address. Such positional addresses may be identified by a start address and an end address associated with unique value identifier stored in the attribute vector. By determining the start address and the end address associated with each unique value identifier, the range of positional addresses over which the unique value identifiers are stored in the attribute vector, may be determined. In an embodiment, the start addresses and the end addresses of some of the unique value identifiers stored in the attribute vector may overlap. In an embodiment, upon receiving a request to search for data represented by the unique value identifiers, the range of positional addresses over which the requested data is to be searched is determined, at 230. Based on the determination, the execution of search for the unique value identifier (e.g., requested data) in the attribute vector is optimized, at 240.

In an embodiment, optimizing the execution of search may correspond to improving an efficiency to search for data. The efficiency to search for data may be improved by reducing a number of scans of row including the data, range of addresses of storage over which dataset may be searched, etc. In an embodiment, the range of addresses over which the data may be searched may include determining a start address and an end address associated with the unique value identifiers. The start address and the end address may correspond to the positional address (e.g., positional information) of the unique value identifiers in the attribute vector. In an embodiment, the execution of search may be optimized by computing the range of positional addresses over which the request data may be searched. As discussed previously, the range of positional addresses may be generated by determining the start address and the end address associated with the unique value identifiers. The search for data may be optimized as the data is searched over a range of positional addresses (e.g., based on the start address and the end address) instead of the entire record set in the attribute vector.

In an embodiment, the data may be searched by execution of SQL queries (e.g., Structured Query Language (SQL)) or stored procedures. For example, the query for searching the data, may include a sequence of continuous unique value identifiers, a sequence of non-continuous unique value identifiers, the unique value identifiers combined using relational, logical, Boolean operators (e.g., AND, OR, etc.), or above combination of queries.

In an embodiment, memory may be used consumed for storing the positional addresses associated with the unique value identifiers. The memory consumed may be optimized (e.g., reduced) when memory constraints are enforced. For example, memory constraints may be enforced at different storage levels (e.g., columns, tables, data store, etc.) and the memory consumed may be optimized. The memory consumed may be optimized based on a decision logic that may, for example, include computing distances (e.g., absolute difference of positional addresses) between the unique value identifiers based on the positional addresses (e.g., start address, end address) of the unique value identifiers. Further, the unique value identifiers may be grouped or combined, based on, for example, a minimum distance (e.g., minimum distance between the addresses) between the unique value identifiers. Upon computing the minimum distance, the data structure (e.g., table) including the unique value identifiers may be updated.

In an embodiment, there may be a tradeoff between an efficiency for searching data (e.g., measured performance for searching data) and memory consumed for storing the positional addresses associated with the unique value identifiers. Such tradeoff may be determined by execution of optimization algorithms (e.g., Greedy algorithm, Linear algorithm, etc.). In an embodiment, execution of optimization algorithms may correspond to execution of instructions or routines related to the optimization algorithms by a processor of a system (e.g., computer).

Figure 3:
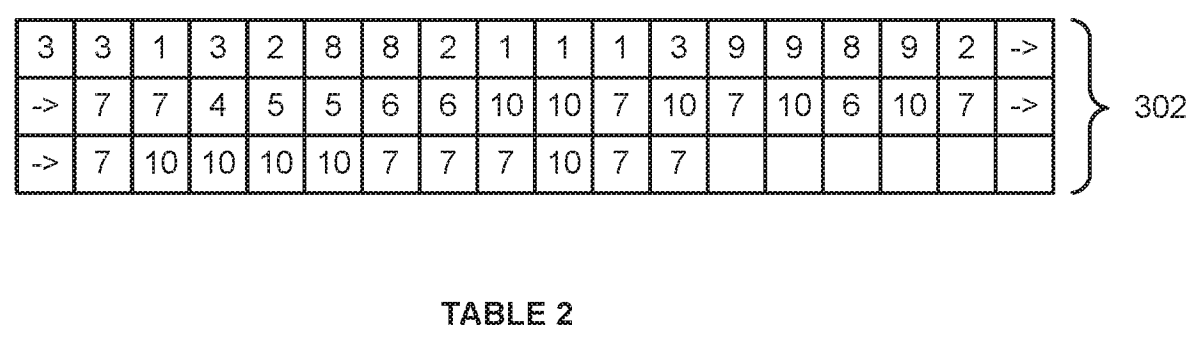

FIG. 3 shows a table representing an attribute vector storing data related to a transaction, according to an embodiment. FIG. 3 shows Table 2 representing an attribute vector storing data value as unique value identifiers. As shown, Table 2 stores data values related to a transaction as unique value identifiers and includes 44 records or entries (e.g., number of records stored as row store or column store). In an embodiment, attribute vector 302 storing unique value identifiers (e.g., 102 and corresponding to dictionary structure of Table 1) may include the start address and the end address associated with each unique identifier. Table 2 in FIG. 3 represents data related to the transaction and shows that each unique value identifier is stored at different positional addresses in attribute vector 302. Hence, each unique value identifier may be stored in attribute vector 302 over a range of positional addresses. In an embodiment, the range of positional addresses may be computed based on the start address and the end address associated with the unique value identifiers stored in attribute vector 302. In an embodiment, the start address and end address of the unique identifiers may be stored in a data structure (e.g., a table). Such a table may also be referred to as positional address matrix.

FIG. 4 is a table representing a data structure storing start address and end address associated with unique value identifiers, according to an embodiment. In an embodiment, Table 3 of FIG. 4 shows the above discussed positional address matrix for attribute vector. As shown. Table 3 in FIG. 4 includes columns dictionary id 402, representing the unique value identifiers, start address 404 and end address 406 associated with each dictionary id 402 (e.g., unique value identifier).

In an embodiment, when a request including a query to search for data is received, a database search engine may optimize the execution to search for the data based on a decision logic. For example, the decision logic may be based on a determination of the start address and the end address of the unique value identifiers. Upon such determination, the data may be searched over one or multiple ranges of positional addresses. The execution of the search, as discussed above, may optimize the mechanism for searching data, as the number of rows to be scanned or parsed for searching the data may be reduced. In an embodiment, such optimization may provide an optimum gain in efficiency or performance searching the data.

For example, let a query correspond to search for transactional data related to 'Phone 5' in attribute vector 302 of Table 2. From Table 1 in FIG. 1, it may be determined that the unique value identifier for data value 'Phone 5' is '5'. Upon parsing or scanning Table 3 in FIG. 4, the database search engine may determine that the unique value identifier '5' is associated with the start address (e.g., 404) is '21' and the end address (e.g., 406) is '22'. In an embodiment, the database search engine may execute search for the data in the range of positional addresses between 21 and 22, instead of searching in the entire attribute vector 302. Hence, the mechanism for searching data is optimized, as the search would be executed in specific range of positional addresses, instead of the entire record set of 44 records in attribute vector 302 in Table 2 of FIG. 3.

FIG. 5 shows a table including metrics related performance for searching data, according to an embodiment. FIG. 5 shows Table 4 including performance metrics expressed in percentage for searching each unique value identifier. As shown, Table 4 in FIG. 5 includes columns, dictionary id 502 representing the unique value identifiers, number of rows to scan 504 representing the number of rows to be scanned or parsed for searching the data, and performance gain 506 expressed in percentage for searching each unique value identifier. In an embodiment, the performance gain may be computed by the ratio of number of rows scanned or parsed, when data is searched in a specific range or multiple ranges of positional addresses to the number of rows scanned or parsed, when data is searched in the entire record set (e.g., 44 records or entries in attribute vector 302 in Table 2 of FIG. 3).

In an embodiment, storing positional addresses (e.g., start address, end address) for each unique value identifier may consume or utilize memory. The memory consumed for storing the start address and the end address (e.g., positional address ranges) for each value identifier may be computed using the equation:

$$\text{Memory consumed} = 2*N*(\log_2(T)) \quad \text{Equation (1):}$$

In Equation (1), 'T' represents the number of records or entries in the attribute vector(e.g., which corresponds to 44 in Table 2 of FIG. 3) and 'N' represents number of unique value identifiers (e.g., count of 10) in dictionary structure (e.g., Table 1 in FIG. 1).

Optimizing search for data when search query includes a range of value identifiers.

In an embodiment, a query (e.g., range query) for searching data may include multiple unique value identifiers. For example, the query may include unique value identifiers that may be in a sequence of continuous values (e.g., value identifiers 1, 2, 3, etc.) or in a sequence of non-continuous values (e.g., value identifiers 2, 4, 1, 3, etc.). In an embodiment, a request to search for data may include a query including a combination of the continuous sequence and the non-continuous sequence of value identifiers. That is, the query may include the unique value identifiers that may be combined with operators, for example, comparison operators, logical operators (e.g., > (greater than), < (less than), >= (greater than or equal to), <= (less than or equal to), "between", etc.), etc. In an embodiment, when the query for searching data includes the above combination of operators, the database search engine may combine one or more range of positional addresses and execute searching for the data. Such a combination of the range of positional addresses may also be referred to as union of range of positional addresses and data may be searched in the union of range of positional addresses.

For example, let a query correspond to search for transactional data related to 'Phone 4'', 'Phone 5' and 'Phone 6'. From Table 3 in FIG. 4, the database search engine may generate the union of range of positional addresses, as explained above. For example, based on the start address 404 and end address 406 of the transactional data related (e.g., Phone 4 corresponds to value identifier 4 with (the start address, the end address)=(20, 20); Phone 5 corresponds to value identifier 5 with (the start address, the end address)= (21, 22); Phone 6 corresponds to value identifier 6 with (the start address, the end address)=(23, 31)). Upon generating the union of range of positional addresses, the database search engine may search for data between start address '20' and end address '31'. In an embodiment, such mechanism searching for the data by generating the union of range of positional addresses may optimize the search for the data and provide a gain in performance for executing the search.

Optimizing search for data when a query includes AND operator.

In an embodiment, a query for searching data may include a Boolean operator, for example, AND operator. When the query includes the AND operator, there may be an overlap between the range of positional addresses as the unique value identifiers may be stored at different ranges of positional addresses. In an embodiment, when the query includes AND operator, an intersection or an overlap in the start addresses and the end addresses associated with the value identifiers may be determined and the data may be searched for in such intersection of the range of positional addresses. For example, consider Select Employee Name from Project A where
department="Retail" AND role="Development" SQL query (1):

The execution of SQL query (1) may search for data, for example, name of employees from the table 'Employee Name' working with "Retail" department in a role defined as "Development". Let the table 'Employee Name' include records or entries, such that rows 20 to 40 correspond to the employees working with the "Retail" department and rows 35 to 50 correspond to the employees working in a role defined as "Development". When the SQL query (1) is executed, the database search engine may determine an intersection in range of positional addresses for value identifiers "Retail", "Development". For example, the database searching engine may determine that the requested data may be searched in between rows 35 to 40. In an embodiment, the response to execution of the search may include names of employees stored in the rows 35 to 40. Such a mechanism for searching data, when the range of positional addresses may be overlapped or intersected, may optimize the search for data.

FIG. 6 shows a table including memory consumed for storing positional addresses associated with data, according to an embodiment. FIG. 6 shows Table 5 including memory consumed for storing positional addresses (e.g., start addresses, end addresses) associated with unique value identifiers. As shown, column 602 shows number of unique value identifiers and columns 604, 606, 608 and 610 show a corresponding memory consumed, when the number of records or entries in the record set increases in volume (e.g., One Billion 604, Ten Billion 606, Hundred Billion 608, One Trillion 610, etc., represent the number of records in a record set). For example, from Table 5, when a volume of data in a record set includes one billion records, and a corresponding dictionary structure includes 100,000 unique value identifiers, the memory consumed to store the positional addresses (e.g., start address and end addresses) associated with the unique value identifiers may be computed to be equal to 712 Kilobytes (KB) and so on. Accordingly, Table 5 shows the memory consumed for storing the positional addresses for various combinations of number of records in the record set and number of unique value identifiers.

FIG. 7 shows a table including the unique value identifiers that optimizes memory consumed for storing positional addresses, according to an embodiment. As discussed previously (e.g., with reference to FIG. 6 and Table 5), memory consumed increases with an increase in volume of data or increase in the number of unique value identifiers. In an embodiment, the memory consumed may be optimized (e.g., reduced) enforcing memory constraints for storing the positional addressees (e.g., start address, end address) associated with the unique value identifiers. The memory constraint may be enforced at different levels of data storage (e.g., data structure storing data may represent an attribute vector, columns of tables, multiple tables, data store, etc.) and the memory consumed for storing the positional addresses may be optimized. In an embodiment, an end user may configure the memory constraint based on the available memory. In an embodiment, a decision logic to optimize the memory consumed for storing the positional addresses may be formulated and executed at a runtime.

In an embodiment, the decision logic to determine optimization of memory may be based on a computation of a number of positional addresses that may be stored, when the memory constraint is enforced. For instance, the number of positional addresses that may be stored in memory, when the memory constraint is enforced, may be computed by equation:

$$N*\text{ceil}(\log_2(R))+2*R*\text{ceil}(\log_2(T))-M\geq 0 \quad \text{Equation (2):}$$

In Equation (2) 'M' represents the memory constraint (e.g., memory consumed to store the positional addresses); 'T' represents the number of records or entries; 'N' represents the number of unique value identifiers in a dictionary structure; represents an integer value of number of possible positional identifiers based on the available memory.

In an embodiment, the decision logic to optimize the memory consumed, when the memory constraint is enforced, may include grouping or combining the unique value identifiers. For example, the unique value identifiers may be combined based on a distance between positional addresses associated with the unique value identifiers, when stored in the attribute vector. In an embodiment, the distances between the unique value identifiers may be computed by determining the start addresses and the end addresses associated with the unique value identifiers. In an embodiment, a decision logic for combining the unique value identifiers may include determining and selecting the minimum distance between the unique value identifiers.

In an embodiment, FIG. 7 shows Table 6 that includes unique value identifiers that may be combined, as explained previously (e.g., determining the positional addresses, computing distance between positional addresses and selecting the minimum distance between to the positional addresses to combine the unique value identifiers). In an embodiment, Table 6 includes columns positional id 702, dictionary id 704 (e.g., representing combined or grouped unique value identifiers), start address 706, end address 708, etc. Such combination of the unique value identifiers may optimize (e.g., reduce) the memory consumed for storing the positional addresses (e.g., start address, end address). In an embodiment, the combining of the unique value identifiers, as explained above, may impact the efficiency for searching data. For example, the performance or the efficiency for searching data may be reduced.

In an embodiment, there may be a tradeoff between performance for searching data and memory consumed for storing the positional addresses. Such tradeoff may be determined by executing a Greedy algorithm. The execution of Greedy Algorithm may provide metrics related to performance (e.g., change in efficiency expressed as a percentage (gain or loss)), when the attribute vector is enforced with the memory constraint.

Greedy Algorithm with memory constraint.

In an embodiment, 'R' represents number of range of positional addresses that may be stored in memory and 'N' represent the total number of unique value identifiers in a dictionary structure. The execution of Greedy algorithm (e.g., routine related to Greedy algorithm) may execute the following steps:

Step 1: R=N;
Step 2: Validate whether 'R' is constrained by Equation (2). If 'R' is constrained by Equation (2), stop execution. If 'R' is not constrained by Equation (2), go to Step 3;
Step 3: Generate positional address distance matrix by computing a distance between the unique value identifiers and selecting the minimum distance between the unique value identifiers;
Step 4: Group or combine the unique value identifiers based on the minimum distance between the unique value identifiers and recursively update the positional address distance matrix;
Steps 5: R=R−1;
Step 6: Repeat Step 2.

Generation of Positional Address Distance Matrix

In an embodiment, the positional address distance matrix may store the distance between the unique value identifiers and assigned positional identifiers. The distances stored in the positional address distance matrix may correspond to a minimum distance between the unique identifier values. The minimum distance between the unique value identifiers may be computed by equation:

$$D = \text{abs}(S_1 - S_2) + \text{abs}(E_2 - E_2) \quad \text{Equation (3):}$$

In Equation (3), '$S_1$' and '$S_2$' represent the start addresses of the unique value identifiers and '$E_1$' and '$E_2$' may represent the end addresses of the unique value identifiers; 'D' represents the absolute value (e.g., absolute difference in values) of the distance between the unique value identifiers.

FIG. 8 shows a table including metrics related to performance for searching data, according to an embodiment. FIG. 8 shows Table 7 that includes metrics related to performance for searching data. As explained previously, the performance metrics may be expressed in percentage and corresponds to searching each unique value identifier (e.g., dictionary id 502). Table 7 includes columns position id 802, dictionary id 804 (e.g., representing grouped combined unique value identifiers), number of rows to scan 806 and performance gain 808 in percentage for searching the unique value identifier. On comparison of performance metrics from column 808 in Table 8 of FIG. 7 and column 506 in Table 4 of FIG. 5, it may be determined that the efficiency for searching data is reduced, when memory constraint is enforced and the unique value identifiers are combined.

FIG. 9 shows a table including positional identifiers for unique value identifiers in the dictionary structure, according to an embodiment. FIG. 9 shows Table 8 including positional identifiers (e.g., position id 904) for each unique value identifier (e.g., dictionary id 902). In an embodiment, Table 8 in FIG. 9 may be generated from Table 6 in FIG. 7.

FIG. 10 shows a table including positional address ranges for positional identifiers, according to an embodiment. FIG. 10 shows Table 9 including start address 1004, end address 1006 for positional identifiers (e.g., position id 1002). In an embodiment, Table 9 in FIG. 10 may be generated from Table 6 in FIG. 7.

FIG. 11 shows tables including start address and end address associated with unique value identifiers and positional address distance matrix, according to an embodiment. FIG. 11 shows Table 10A and Table 10B. In an embodiment, Table 10A corresponds to Table 3 of FIG. 4 including start address 1108 and end address 1110 for each dictionary id 1106 (e.g., unique value identifier). Table 10A is shown as dictionary 1102 in FIG. 11. In an embodiment, Table 10B corresponds to positional address distance matrix 1104. As explained previously, the positional address distance matrix 1104 may be generated and minimum distance between the positional addresses associated with the unique value identifiers may be selected. For example, the top row and first column including values 1, 2, 3, etc., may represent the unique value identifiers and the values, for example, 8, 3, 9, 26, 18, 27, etc., may represent the distances between the positional addresses between the unique value identifiers. As explained previously, the distances may be computed, using Equation (3).

FIG. 12 shows tables including start address and end address associated with unique value identifiers and positional address distance matrix, according to an embodiment. FIG. 12 shows Table 11A and Table 11B. In an embodiment, Table 11A corresponds to Table 3 of FIG. 4 including start address 1208 and end address 1210 for each dictionary id 1206 (e.g., unique value identifier). Table 11A is shown as dictionary 1202 in FIG. 12. In an embodiment, Table 11B corresponds to positional address distance matrix 1204. As explained previously, the positional address distance matrix 1204 may be generated and minimum distance between the positional addresses associated with the unique value identifiers may be selected. For example, the top row and first column including values 1, 2, 3, etc., may represent the unique value identifiers and the values, for example, 8, 3, 9, 26, 18, 27, etc., may represent the distances between the positional addresses between the unique value identifiers. As explained previously, the distances may be computed, using Equation (3). In Table 11B, the first column shows combination of unique value identifiers. For example, unique value identifiers 1,3 are grouped based on decision logic, as explained previously.

FIG. 13 shows tables including start address, end address associated with unique value identifiers and positional address distance matrix, according to an embodiment. FIG. 13 shows Table 12A and Table 12B. As explained previously, the unique value identifiers may be combined by computing the absolute difference in values between the start address and the end address associated with the unique value identifiers. Based on the computed absolute differences and selecting the minimum distance between the unique value identifiers, the data structure may be updated. In an embodiment, Table 12A shows dictionary 1302 including dictionary id 1306, start address 1308 and end address 1310. The column dictionary id 1306 includes unique value identifiers that may be combined, as explained previously. The columns 1304 represent address distance matrix (e.g., positional address distance matrix). For example, Table 12A and Table 12B may be generated by computing the distances (e.g., as explained above with reference to FIGS. 11 and 12) and updating the data structure including the start address and the end address. Upon iteratively computing the distances between the unique value identifiers and updating the data structure including the positional addresses of unique value identifiers, Table 12A and Table 12B may be generated.

Memory optimization for storing multiple ranges of positional addresses.

In an embodiment, memory consumed for storing the positional addresses of unique value identifiers may be optimized for multiple ranges of positional address. For example, a data structure (e.g., table) including multiple ranges of positional addresses may be generated and corresponding multiple partitions may be created on the attribute vectors. Each range of positional address may correspondingly associate with each partition in the attribute vector and each range of positional address may be assigned with positional identifiers.

In an embodiment, memory consumed or memory utilized for storing multiple ranges of positional addresses in the data structure may be computed using the equation:

$$X = N*\text{ceil}(\log_2(N)) + 2*N*\text{ceil}(\log_2(T)) \quad \text{Equation (4):}$$

In Equation (4), represents the number of unique identifier values in the dictionary structure associated with the attribute vector; 'T' represents the number of records or entries in the attribute vector (or the column); 'X' represents the memory consumed for generating the data structure including multiple ranges of positional addresses, when number of positional identifiers is equal to number of unique value identifiers.

In an embodiment, number of ranges of positional addresses, that may correspond to the number of partitions of the attribute vector, may be computed using the equation:

$$F = \frac{M}{X} \quad \text{Equation (4A)}$$

In Equation (4A), 'F' represents the floor quotient, which may represent to number of ranges of positional addresses or number of partitions on the attribute vector; 'E' may represent the remainder of Equation (4A) which may represent to the unused memory. If value of 'E' is zero, then 'F' represents the number of ranges of positional addresses with 'N' records. If value of 'E' is non-zero, then 'F+1' represents the number of ranges of positional address by enforcing to the following constraints:
  (i) If value of 'E' is less than 40% of 'X', then 'F' number of positional address ranges may be created;
  (ii) If value of 'E' is more than 40% of 'X', then 'F+1' number of positional address ranges may be created.

In an embodiment, when R>N and 'E' is not equal to zero, then the equation for multiple range of positional addresses may be formulated as:

$$F*X + N*\text{ceil}(\log_2(V')) + 2*V'*\text{ceil}(\log_2(T)) \quad \text{Equation (5):}$$

In Equation (5), V' represents number of positional identifiers required in the last partition of the attribute vector, which may be represented by a decimal number, generating using:

$$V = \text{floor}(V') \quad \text{Equation (6):}$$

In an embodiment, if 'B' represents number of partitions on the attribute vector, then:

$$B = \text{ceil}\left(\frac{T}{F}\right) \quad \text{Equation (7)}$$

FIG. 14 shows a table including multiple positional identifiers for unique value identifiers, according to an embodiment. FIG. 14 shows Table 13 including multiple positional identifiers (e.g., Position ID-I 1404, Position ID-II 1406, Position ID-III assigned for each unique value identifier (e.g., dictionary id 1402). As explained previously (e.g., with reference to Table 8, Table 9, Table 10, Table 11, and Table 12), positional address ranges for each unique value identifier assigned with positional identifiers may be generated.

FIG. 15 shows tables including positional address manges associated with multiple positional identifiers, according to an embodiment. FIG. 15 shows Table 14A, Table 14B and Table 14C including start addresses and end addresses for multiple positional identifiers (e.g., Position ID-I, Position Position ID-III). In an embodiment, Table 14A includes columns Position ID-I 1502, start address 1304 and end address 1506. In an embodiment, Table 14B includes columns Position ID-II 1508, start address 1510 and end address 1512. In an embodiment, Table 14C includes columns Position ID-III 1514, start address 1516, and end address 1518. As explained previously, the range of positional addresses and corresponding positional identifiers may be determined and based on such determination, tables 14A, 14B and 14C may be generated. For example, Tables 14A, 14B and 14C may be generated from Table 13, which may include range of positional addresses for corresponding positional identifiers (e.g., Position ID-I 1404, Position ID-II 1406, Position ID-III 1408) of Table 13 from FIG. 14.

Enforcing memory constraint on multiple columns of a table.

In an embodiment, memory constraint may be enforced on multiple columns of a table stored in an in-memory data store. The columns on which memory constraint may be enforced may be prioritized based on historical data access information associated the columns. In an embodiment, memory consumed for storing the positional addresses associated with multiple columns may be optimized, by enforcing memory constraint on the multiple columns. By formulating an objective and maximizing the objective function based on the memory constraint, the memory consumed for storing the positional addresses associated with the unique value identifiers may be optimized.

In an embodiment, the objective function may be formulated as:

$$\text{Max } \Sigma_{i=1}^{N}(P_i*W_i) \quad \text{Equation (8):}$$

In Equation (8), 'Pi' represents performance gain (e.g., efficiency for searching data) in 'i$^{th}$' column; 'Wi' represents the weight (e.g., priority based on historical data access information) for 'i$^{th}$' column. In an embodiment, when Equation (8) is maximized by enforcing memory constraint, the memory consumed for storing the positional addresses associated with the multiple columns may be optimized. For example, the decision logic to determine assigning the priority for a column may be based on number of queries accessing the data from the column for a predetermined time period. The priority to the columns may be assigned during a runtime and may be represented as percentages. In an embodiment, the performance gain for searching data in multiple columns, may be computed by:

$$P_i = (\Sigma_{k=1}^{M_i}(T-(E_k-S_k)))*\text{ceil}(\log_2(M_i)) \quad \text{Equation (9):}$$

In Equation (9), 'k' represents row position of each unique value identifier; '$E_k$' represents end address associated with each unique value identifier; '$S_k$' represents the start address associated with each unique value identifier; '$M_i$' represents the total number of unique value identifiers in the column.

Greedy Algorithm with memory constraint on multiple columns of a able.

In an embodiment, when a query for searching data is executed; the average number of times the multiple columns may be parsed or scanned, may be computed by:

$$A_i = \frac{\sum_{j=1}^{M_i} \text{abs}(E_j - S_j)}{M_i} \quad \text{Equation (10)}$$

In an embodiment, the performance gain for searching data in the multiple columns, may be computed using:

$$P_i = (T - A_i) * M_i * \text{ceil}(\log_2(M_i)) \quad \text{Equation (11):}$$

The memory consumed for storing a range of positional addresses associated with unique value identifiers in multiple columns, may be computed using equation:

$$m_i = M_i * \text{ceil}(\log_2(R_i)) + 2 * R_i * \text{ceil}(\log_2(T)) \quad \text{Equation (12):}$$

In Equation (12), represents the memory consumed for the range of positional addresses. In an embodiment, memory consumed may be optimized when the objective function (e.g., Equation (8)) is maximized by enforcing constraint defined by equation:

$$\Sigma_{i=1}^{N}(m_i \leq M) \quad \text{Equation (13):}$$

In an embodiment, the execution of Greedy algorithm may include the following steps:

Step 1: Calculate $R_i$ for multiple columns by enforcing the memory constraint

If $R_i \geq M_i$, then $R_i = M_i$ and exit

Step 2: Using positional address matrix, compute:

A. Average Scan Ai

B. $C_i = P_i * W_i$ for all columns that are assigned priority

Step 3: Sort all the columns with $C_i$ in descending order

Step 4: Select the first column from the sorted columns and compute memory required using Equation (12)

Step 5: $M = M = m_i$

Step 6: Create the positional address for all unique value identifiers of the '$i^{th}$' column and remove the first column from the sorted list of columns Step 7: If M>0, go to Step 1

In an embodiment, the Greedy algorithm with memory constraint for multiple columns may provide an approximation with an optimum tradeoff between the performance for searching the data and the memory consumed for storing the positional addresses. In an embodiment, a linear algorithm may be executed to optimize the memory consumed for storing the positional addresses associated with the multiple columns.

Linear Algorithm to optimize memory for storing positional addresses associated with multiple columns of a table In an embodiment, memory consumed for storing positional addresses associated with multiple columns may be optimized by executing a Linear algorithm (e.g., a routine or set of instructions related to Linear algorithm). As explained previously, a priority or weight for the columns (e.g., based on data access information) may be assigned and memory constraint 'M' may be enforced on the columns. In an embodiment, the memory constraint may be enforced on multiple columns of a table and such an enforcement of memory constraint may correspond to table level constraint.

In an embodiment, performance gain for searching the data in the '$i^{th}$' column with '$j^{th}$' positional address range index may be computed by:

$$P_{i,j} = (T - A_{i,j}) * M_i * \text{ceil}(\log_2(M_i)) \quad \text{Equation (14):}$$

In Equation (14), 'i' represents the index of column; 'j' represents the positional address range index; for example positional address ranges may be assigned values {N, N/2. N/4, N/8}; When the positional address range corresponds to N/4, then index of j=2, and so on; $P_{i,j}$ represents the performance gain of '$i^{th}$' column with '$j^{th}$' positional address range index; represents the average performance of the '$i^{th}$' column with '$j^{th}$' positional address range index; represents the number of unique value identifiers for the '$i^{th}$' column.

In an embodiment, by formulating an objective and maximizing the objective function by enforcing memory constraint, the memory consumed for storing the positional addresses associated with multiple columns may be optimized.

In an embodiment, the objective function may be formulated by:

$$\text{Max } \Sigma_{i=1}^{N}\Sigma_{j=1}^{k}(P_{i,j} * W_i * x_{i,j}) \quad \text{Equation (15):}$$

Equation (15) may be subject to constraint, defined by equation:

$$\text{for all columns; } \Sigma_{j=1}^{k} x_{i,j} \leq 1 \quad \text{Equation (16):}$$

In Equations (15) and (16), $x_{i,j}$ represents a binary variable (e.g., a decision variable), which can take a value 0 or 1 for '$i^{th}$' column with '$j^{th}$' positional address range index; 'k' represents total number of number of positional address ranges. Equation (16) represents the constraint for '$i^{th}$' column with '$j^{th}$' positional address range index. For each '$j^{th}$' positional address range index, the memory consumed by '$i^{th}$' column may be computed by Equation (12) by substituting positional address ranges defined by {N, N/10, N/100, N/500}, etc., and memory consumed for storing the positional addresses may be computed. For example, '$m_{i,j}$' may represent memory consumed for storing positional address for '$i^{th}$' column and '$j^{th}$' positional address range index.

In an embodiment, memory constraint may be defined by equation:

$$\Sigma_{i=1}^{N}\Sigma_{j=1}^{k}(m_{i,j} * x_{i,j}) \leq M \quad \text{Equation (17):}$$

Equation (17) represents memory constraint. By enforcing the memory constraint and maximizing the objective function, the amount of memory consumed for storing positional addresses associated with the multiple columns may be optimized. In an embodiment, enforcing such memory constraint on the multiple columns may optimize the memory consumed, such that the total memory allocated for storing the positional addresses associated with the multiple columns does not exceed the enthrced memory constraint.

FIG. 16A shows tables including metrics related to positional address range indices, average number of scans required to search data, priority assignment to the columns, computed performance gain, according to an embodiment. FIG. 16A shows Table 15A, Table 15B, Table 15C and Table 15D. In an embodiment, Table 15A includes columns 1602, 1604, 1608 and 1610 comprising positional address range index 1602 values for multiple columns 1604, 1606, 1608, and 1610. For example, the positional address range may correspond to {N, N/10, N/100, N/500} as shown in column 1602. In an embodiment, Table 15B includes columns 1612, 1614, 1616, 1618, and 1620. The values in columns 1614, 1616, 1618 and 1620 represent the number of scans required to search for data. For instance, values in columns 1614, 1616, 1618 and 1620 may be represented in percentage of records per billion of records or entries in the attribute vector. Number '30' in 1614 may represent the average number of scans required for each positional address index. In an embodiment, Table 15C includes columns 1622, 1624, 1626, 1628 and 1630, and priority or weight 1622 for the columns 1624, 1626, 1628 and 1630. In an embodiment. Table 15D includes columns 1632, 1634, 1636, 1638 and 1640, representing performance gain (e.g., indicated by 1634, 1636, 1638 and 1640 for the respective columns) that is computed using product of Equation (14) and priority or weight of each column.

FIG. 16B shows tables including metrics related to memory consumed for storing positional addresses, value of decision variable for maximizing the objective function using Linear algorithm, computation of objective value, and memory consumed for a positional address range index, according to an embodiment. FIG. 16B shows Table 15E, Table 15F, Table 15G and Table 15H. In an embodiment, Table 15E includes columns 1642, 1644, 1646, 1648 and 1650. The values in columns 1642, 1644, 1646, 1648 and 1650 represent the memory consumed for storing the positional address ranges {N, N/10, N/100, N/500} in kilobytes (KBs) for the corresponding columns. The memory consumed may be computed using Equation (12). In an embodiment, Table 15F includes the columns 1652, 1654, 1656, 1658 and 1660. Table 15F shows value (e.g., 0 or 1 in columns 1654, 1656, 1658 and 1660) of $x_{i,j}$ for the decision variable such that the objective function is maximized. In an embodiment, Table 15G shows computed values for an objective value (e.g., 1662) for multiple positional address ranges based on the value of the decision variable (e.g., in Table 15F with value of decision variable as 1). In an embodiment, Table 15H includes the columns 1664, 1666, 1668, 1670 and 1672 and shows memory consumed for storing the positional address range indices based on the decision variable (e.g., in Table 15F with value of decision variable as 1).

Enforcing memory constraint on a database.

In an embodiment, a memory constraint may be enforced on multiple tables stored in a database. Enforcing memory constraint on multiple tables may correspond to enforcing memory constraint on the database. In an embodiment, enforcing the memory constraint at the database level reduces the complexity of assigning memory constraints to the tables or columns of the tables individually. Further, enforcing memory constraint at the database level may provide better optimization of memory when compared to optimization achieved by enforcing memory constraints on the multiple columns of the tables or on the multiple tables. By enforcing memory constraint at the database level, the memory consumed or memory utilized for storing positional addresses associated with the multiple tables or multiple columns in the database may be optimized. As discussed previously, execution of Linear algorithm may optimize the memory for storing a range of positional addresses associated with the unique value identifiers.

In an embodiment, for searching data, the average number of times the $i^{th}$ column is parsed or scanned, may be computed by:

$$A_i = \frac{\sum_{j=1}^{M_{t,i}} abs(E_j - S_j)}{M_{t,i}} \quad \text{Equation (18)}$$

In an embodiment, the performance gain for searching data in an $i^{th}$ column for a $t^{th}$ table, may be computed by:

$$P_{t,i} = (T - A_{t,i}) * M_{t,i} * ceil(log_2(M_{t,i})) \quad \text{Equation (19):}$$

The memory consumed for storing a range of positional addresses may be computed using the equation:

$$m_{t,i} = M_{t,i} * ceil(log_2(R_{t,i})) + 2 * R_{t,i}(ceil(log_2(T_i))) \quad \text{Equation (20):}$$

In an embodiment, when M is a memory constraint, the memory constraint may be enforced by:

$$\Sigma_{t=1}^i \Sigma_{i=1}^t m_{i,j} \leq M \quad \text{Equation (21)}$$

In Equations (18), (19), (20) and (21), '$A_{t,i}$' represents the average number of scans of an '$i^{th}$' column in '$t^{th}$' table; '$M_{t,i}$' represents number of unique records in an '$i^{th}$' column of '$t^{th}$' table; '$R_{t,i}$' represents number of records in an '$it^{th}$' column of a '$t^{th}$' table; '$P_{t,i}$' represents performance gain for an '$i^{th}$' column of a '$t^{th}$' table; $m_{t,i}$ represents memory consumed for storing a range of positional addresses for an '$i^{th}$' column of a '$t^{th}$' table; '$T_t$' represents total number of records or entries in a '$t^{th}$' table.

Greedy Algorithm with memory constraint at database level

In an embodiment, the execution of Greedy algorithm may include the following steps:

Step 1: Calculate '$R_{t,i}$' for multiple columns based on the memory constraint:

A. If $R_{t,i} >= M_{t,i}$, then $R_{t,i} = M_{t,i}$ and exit

Step 2: Using positional matrix results from Ru, compute:

(i) Average Scan $A_{t,i}$ (ii) $C_{t,i} = P_{t,i} * W_{t,i}$ for all prioritized columns Step 3: Based on the computation of $C_{t,i}$ sort all prioritized columns in descending order Step 4: Select a first column from the sorted columns and compute memory required using Equation (20)

Step 5: Update $M = M - m_{t,i}$

Step 6: Create the positional address for all unique value identifiers of the '$i^{th}$' column of '$t^{th}$' table and remove the first column from the sorted list of columns Step 7: If M>0, go to Step 1.

In an embodiment, the Greedy algorithm with memory constraint at database level may provide an approximation with an optimum tradeoff between the performance for searching the data and the memory consumed for storing the positional addresses. In an embodiment, a linear algorithm may be executed to optimize the memory consumed for storing the positional addresses at the database level.

Linear Algorithm to optimize memory at database level

In an embodiment, amount of memory consumed for storing positional addresses using memory constraint at database level, may optimized by execution of a linear algorithm (e.g., a routine related to linear algorithm). As discussed previously, the memory may be optimized by assigning priority for column of '$t^{th}$' table, formulating an objective function and maximizing the objective function by enforcing memory constraint 'M' at the database level.

In an embodiment, the objective function may be formulated by:

$$Ma\square\Sigma_{t=1}^i \Sigma_{i=1}^{Nt} \Sigma_{j=1}^k (P_{t,i,j} * W_{t,i} * x_{t,i,j}) \quad \text{Equation (22):}$$

Equation (15) may be subject to constraint, defined by equation:

$$\text{for all columns: } \Sigma_{j=1}^k x_{t,i,j} \leq 1 \quad \text{Equation (23):}$$

In Equations (15) and (16), $x_{t,i,j}$ is a binary variable representing a decision variable, which can take a value 0 or 1 for '$i^{th}$' column with '$j^{th}$' positional address index for '$t^{th}$' table; 'k' represents an index associated with a number of positional addresses. Equation (21) enforces constraint such that '$j^{th}$' positional address index may be selected for '$i^{th}$' column for '$t^{th}$' table. For each '$j^{th}$' positional address index, the memory consumed by '$i^{th}$' column may be computed by Equation (20) by substituting {N, N/10, N/100, N/500}, etc., and memory consumed may be represented by '$m_{t,i,j}$' which indicates memory consumed for positional address storage for '$i^{th}$' column and '$j^{th}$' positional address index for '$t^{th}$' table.

In an embodiment, memory constraint may be enforced by:

$$\Sigma_{i=1}^{i} \Sigma_{i=1}^{Nt} \Sigma_{j=1}^{k}(m_{t,i,j} * x_{t,i,j}) \leq M \text{ Equation (24)}:$$

Equation (24) enforces memory constraint on '$i^{th}$' column with positional address index for '$t^{th}$' table, such that the total memory allocated for the multiple columns does not exceed the memory allocated at database level.

FIG. 17A shows tables including metrics related to positional address range indices, according to an embodiment. FIG. 17A shows Table 16A represented by Table 16A1, Table 16A2, Table 16A3 and Table 16A4. In an embodiment, Table 16A1 includes columns 1702 column positional address range index 1702 values for multiple columns 1704, 1706 and 1708. For example, the positional address range may correspond to {N, N/10, N/100, N/500} as shown in column 1702 for 1 billion record entries. In an embodiment, Table 16A2 includes column positional address range index values for multiple columns 1710 and 1712. In an embodiment, Table 16A3 includes column positional address range index values 1714 for multiple columns 1716, 1718 and 1720. For example, the positional address range may correspond to {N, N/10, N/100, N/500} as shown in column 1714 for 1 trillion record entries. In an embodiment, Table 16A4 includes column positional address range index values for multiple columns 1722, 1724, 1726 and 1728.

FIG. 17B shows tables including metrics related to priority assignment to the columns, and average number of scans required to search data, according to an embodiment. FIG. 17B shows Tables 16B and 16C. In an embodiment. Table 16B includes 1730 representing Table 1, 1732 representing Table 2, 1734 representing Table 3, and 1736 representing Table 4. The columns (e.g., COL1, COL2, COL3) in the respective tables (e.g., 1730, 1732, 1734 and 1736) include priority or weight for each column. In an embodiment, Table 16C includes 1738; 1740, 1742, 1744, representing Table 1; 1746, 1748 representing Table 2; 1750, 1752, 1754 representing Table 3 and 1756, 1758, 1760 and 1762 representing Table 4. The values in column 1740, 1742, 1744, 1746, 1748, 1750, 1752, 1754, 1756, 1758, 1760 and 1762 represents the number of scans required to search for data.

FIG. 17C shows tables including metrics related to memory consumed for storing positional addresses, value of decision variable for maximizing the objective function using Linear algorithm, according to an embodiment. FIG. 17C shows tables Table 16D and Table 16E. In an embodiment, Table 16D includes column 1764, 1766 representing Table 1, 1768 representing Table 2, 1770 representing Table 3 and 1772 representing Table 4. The columns in the tables (e.g., 1766, 1768, 1770 and 1772) include values representing the memory consumed for the positional address ranges {N, N/10, N/100, N/500} 1764. The memory consumed may be computed using Equation (20). In an embodiment, Table 16E includes columns 1774, 1776, 1778, 1780 and 1782. The columns 1776, 1778, 1780 and 1782 respectively include values 0 or 1 for $x_{i,j}$, the decision variable such that the objective function is maximized.

FIG. 17D shows tables including metrics related to memory consumed for a positional address range index, according to an embodiment. In an embodiment, Table 16F includes column 1784, 1786 representing Table 1, 1788 representing Table 2, 1790 representing Table 3, and 1792 representing Table 4. The columns in the respective Tables (e.g., 1786, 1788, 1790 and 1792) show memory consumed for storing the positional address range indices based on the decision variable (e.g., in Table 15F with value of decision variable as 1).

In an embodiment, when data is merged from delta memory to the main memory in the in-memory data store, the positional addresses of the data (e.g., unique value identifiers) in the attribute vectors may be modified. For example, when data is merged, positional addresses may be modified when new rows are added or deleted. In an embodiment, the addition or deletion of new rows may correspond to changing or modifying the start address and/or the end address of the unique value identifiers stored in the attribute vector.

In an embodiment, the above discussed optimization algorithms provide metrics related to memory consumed and efficiency with which data may be searched. Depending on the business need, an end user may optimize memory consumed by enforcing memory constraint with a tradeoff of reduced efficiency or may optimize search for data with the tradeoff of increase in memory consumption.

Figure 18:
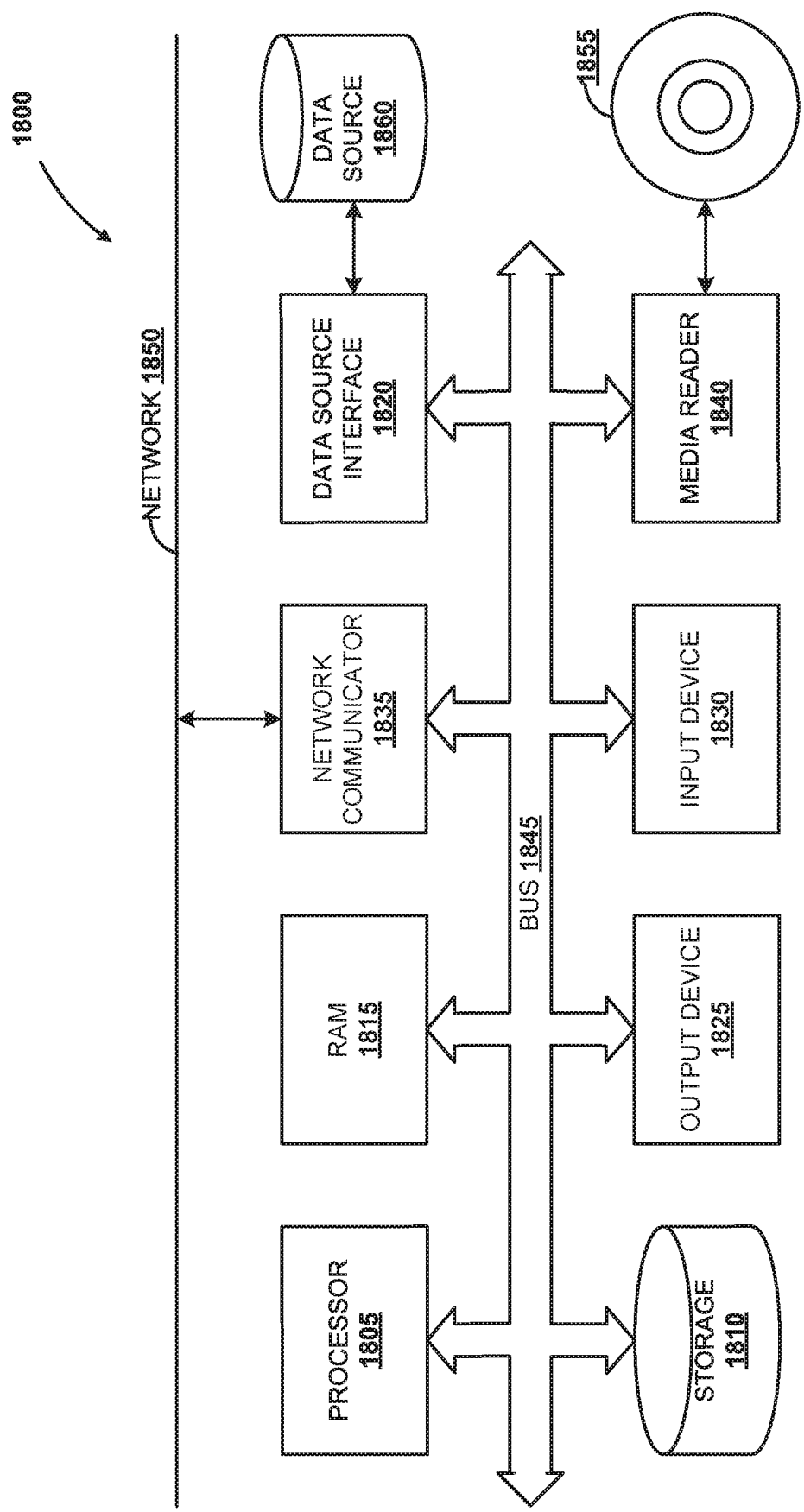
FIG. 18 is a block diagram of a computer system, according to an embodiment.

FIG. 18 is a block diagram of an exemplary computer system 1800, according to an embodiment. Computer system 1800 includes processor 1805 that executes software instructions or code stored on computer readable storage medium 1855 to perform the above-illustrated methods. Processor 1805 can include a plurality of cores. Computer system 1800 includes media reader 1840 to read the instructions from computer readable storage medium 1855 and store the instructions in storage 1810 or in random access memory (RAM) 1815. Storage 1810 provides a large space for keeping static data where at least some instructions could be stored for later execution. According to some embodiments, such as some in-memory computing system embodiments, RAM 1815 can have sufficient storage capacity to store much of the data required for processing in RAM 1815 instead of in storage 1810. In some embodiments, all of the data required for processing may be stored in RAM 1815. The stored instructions may be further compiled to generate other representations of the instructions and dynamically stored in RAM 1815. Processor 1805 reads instructions from RAM 1815 and performs actions as instructed. According to one embodiment, computer system 1800 further includes output device 1825 (e.g., a display) to provide at least some of the results of the execution as output including, but not limited to, visual information to users and input device 1830 to provide a user or another device with means for entering data and/or otherwise interact with computer system 1800. These output device 1825 and/or input device 1830 could be joined by one or more additional peripherals to further expand the capabilities of computer system 1800. Network communicator 1835 may be provided to connect computer system 1800 to network 1850 and in turn to other devices connected to network 1850 including other clients, servers, data stores, and interfaces, for instance. The modules of computer system 1800 are interconnected via bus 1845. Computer system 1800 includes a data source interface 1820 to access data source 1860. Data source 1860 can be accessed via one or more abstraction layers implemented in hardware or software. For example, data source 1860 may be accessed by network 1850. In sonic, embodiments data source 1860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as. Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to optimize search for data, comprising:
   for a plurality of unique value identifiers associated with a dictionary structure, computing, by a processor of a computer, a start address and an end address associated with the plurality of unique value identifiers stored in an attribute vector;
   based on the computation, generating and storing, by the processor of the computer, a range of positional addresses and the corresponding plurality of unique value identifiers in a first data structure;
   upon receiving a request to search for the data represented by one or more unique value identifiers, determining, by the processor of the computer, one or more ranges of positional addresses to be searched for the requested data; and
   based on the determination, optimizing, by the processor of the computer, an execution of the search for the one or more unique value identifiers in the attribute vector.

2. The computer implemented method of claim 1, wherein optimizing the execution of the search for the one or more unique value identifiers, comprises:
   determining, by the processor of the computer, a start address associated with the one or more unique value identifiers stored in the attribute vector;
   determining, by the processor of the computer, an end address associated with the one or more unique value identifiers stored in the attribute vector; and
   optimizing, by the processor of the computer, the executing of the search by searching for the one or more unique value identifiers in the one or more ranges of the positional addresses in the attribute vector.

3. The computer implemented method of claim 1, wherein the request to search for the data is selected from a group consisting of a query including a sequence of continuous unique value identifiers, a sequence of non-continuous unique value identifiers, a query including the one or more unique value identifiers combined using Boolean operators, or a query including a combination thereof.

4. The computer implemented method of claim 1, further comprising: optimizing, by the processor of the computer, memory to store the first data structure in an in-memory data store, when a memory constraint is enforced on one or more attribute vectors.

5. The computer implemented method of claim 4, wherein: the memory constraint is enforced on selected from the group consisting of one or more columns of a plurality of tables residing in the in-memory data store, the plurality of tables residing in the in-memory data store, and the in-memory data store.

6. The computer implemented method of claim 4, wherein optimizing memory to store the first data structure, comprises:
   computing, by the processor of the computer, the start address and the end address associated with the plurality of unique value identifiers;
   computing, by the processor of the computer, one or more distances between the plurality of unique value identifiers based on the computed start address and the end address associated with the plurality of unique value identifiers; and
   combining, by the processor of the computer, at least two or more unique value identifiers based on a minimum distance from the computed one or more distances between the plurality of unique value identifiers.

7. The computer implemented method of claim 5, wherein computing the minimum distance between the plurality of unique value identifiers, comprises:
   computing, by the processor of the computer, an absolute difference in values between the start address and the end address associated the plurality of unique value identifiers; and
   based on the computed absolute difference values, updating, by the processor of the computer, the first data structure including the minimum distance between the plurality of unique value identifiers.

8. The computer implemented method of claim 1, further comprising: optimizing by the processor of the computer, one of the search for the data and the memory consumed for storing the positional addresses associated with the plurality of unique value identifiers, by executing an optimization algorithm selected from a group consisting of a Greedy algorithm and a Linear algorithm.

9. A computer system to optimize search for data, comprising:
   a memory storing computer instructions; and
   a processor communicatively coupled with the memory to execute the instructions to perform operations, comprising:

for a plurality of unique value identifiers associated with a dictionary structure, compute a start address and an end address associated with the plurality of unique value identifiers stored in an attribute vector;

based on the computation, generate and store a range of positional addresses and the corresponding plurality of unique value identifiers in a first data structure;

upon receiving a request to search for the data represented by one or more unique value identifiers, determine one or more ranges of positional addresses to be searched for the requested data; and based on the determination, optimize an execution of the search for the one or more unique value identifiers in the attribute vector.

10. The computer system of claim 9, wherein optimizing the execution of the search for the one or more unique value identifiers, comprises:

determining a start address associated with the one or more unique value identifiers stored in the attribute vector;

determining an end address associated with the one or more unique value identifiers stored in the attribute vector; and optimizing the executing of the search by searching for the one or more unique value identifiers in the one or more ranges of the positional addresses in the attribute vector.

11. The computer system of claim 9, wherein the request to search for the data is selected from a group consisting of a query including a sequence of continuous unique value identifiers, a sequence of non-continuous unique value identifiers, a query including the one or more unique value identifiers combined using Boolean operators, or a query including a combination thereof.

12. The computer system of claim 9, further comprising: optimizing memory to store the first data structure in an in-memory data store, when a memory constraint is enforced on one or more attribute vectors.

13. The computer system of claim 12, wherein: the memory constraint is enforced on selected from the group consisting of one or more columns of a plurality of tables residing in the in-memory data store, the plurality of tables residing in the in-memory data store, and the in-memory data store.

14. The computer system of claim 12, wherein optimizing memory to store the first data structure, comprises:

computing the start address and the end address associated with the plurality of unique value identifiers;

computing one or more distances between the plurality of unique value identifiers based on the computed start address and the end address associated with the plurality of unique value identifiers; and combining at least two or more unique value identifiers based on a minimum distance from the computed one or more distances between the plurality of unique value identifiers.

15. The computer system of claim 14, wherein computing the minimum distance between the plurality of unique value identifiers, comprises:

computing an absolute difference in values between the start address and the end address associated the plurality of unique value identifiers; and based on the computed absolute difference values, updating the first data structure including the minimum distance between the plurality of unique value identifiers.

16. The computer system of claim 9, further comprising: optimizing one of the search for the data and the memory consumed for storing the positional addresses associated with the plurality of unique value identifiers, by executing an optimization algorithm selected from a group consisting of a Greedy algorithm and a Linear algorithm.

17. A non-transitory computer readable storage medium tangibly storing instructions, which when executed by a computer, cause the computer to execute operations, comprising:

for a plurality of unique value identifiers associated with a dictionary structure, compute a start address and an end address associated with the plurality of unique value identifiers stored in an attribute vector;

based on the computation, generate and store a range of positional addresses and the corresponding plurality of unique value identifiers in a first data structure;

upon receiving a request to search for the data represented by one or more unique value identifiers, determining one or more ranges of positional addresses to be searched for the requested data; and based on the determination, optimize an execution of the search for the one or more unique value identifiers in the attribute vector.

18. The non-transitory computer readable storage medium of claim 17, further comprises:

determine a start address associated with the one or more unique value identifiers stored in the attribute vector;

determine an end address associated with the one or more unique value identifiers stored in the attribute vector; and optimize the executing of the search by searching for the one or more unique value identifiers in one or more ranges of the positional addresses in the attribute vector.

19. The non-transitory computer readable storage medium of claim 17, wherein the request to search for the data is selected from a group consisting of a query including a sequence of continuous unique value identifiers, a sequence of non-continuous unique value identifiers, a query including the one or more unique value identifiers combined using Boolean operators, or a query including a combination thereof.

20. The non-transitory computer readable storage medium of claim 17, further comprising: optimizing memory to store the first data structure in an in-memory data store, when a memory constraint is enforced on one or more attribute vectors.

* * * * *